Sept. 3, 1968     G. WEASEL, JR     3,399,426
METHOD OF AND APPARATUS FOR EXTRUDING THERMOPLASTIC MATERIAL
Filed Oct. 5, 1964     2 Sheets-Sheet 1
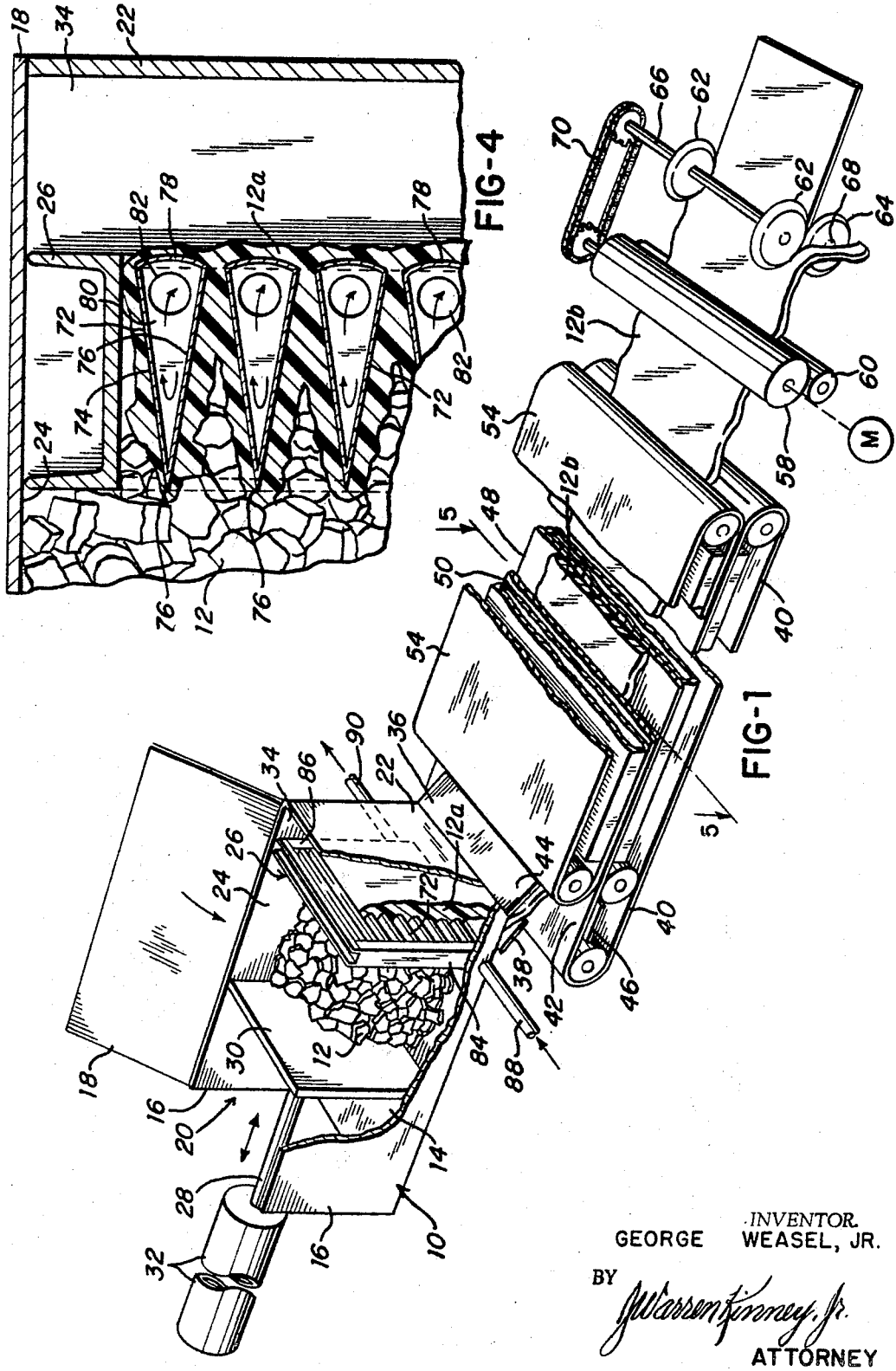
INVENTOR.
GEORGE WEASEL, JR.
BY
*J. Warren Kinney, Jr.*
ATTORNEY Sept. 3, 1968 G. WEASEL, JR 3,399,426
METHOD OF AND APPARATUS FOR EXTRUDING THERMOPLASTIC MATERIAL
Filed Oct. 5, 1964 2 Sheets-Sheet 2
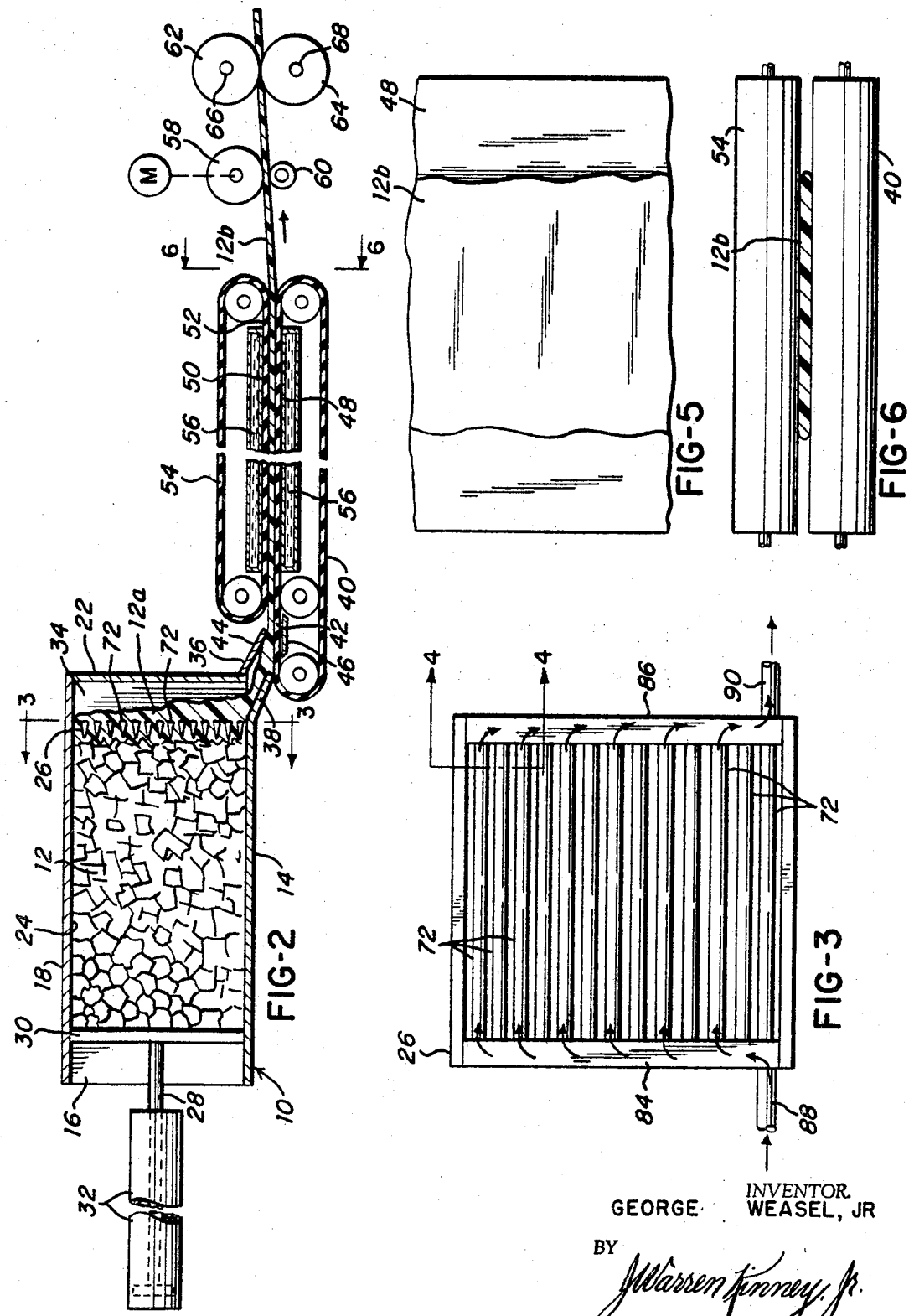
INVENTOR.
GEORGE WEASEL, JR
BY
*J. Warren Kinney, Jr.*
ATTORNEY United States Patent Office 3,399,426
Patented Sept. 3, 1968

3,399,426
METHOD OF AND APPARATUS FOR EXTRUD-
ING THERMOPLASTIC MATERIAL
George Weasel, Jr., McClure, Ohio, assignor to Advance
Industries, Inc., London, Ohio, a corporation of Ohio
Filed Oct. 5, 1964, Ser. No. 401,380
7 Claims. (Cl. 18—12)

ABSTRACT OF THE DISCLOSURE

A relatively large mass of dry thermoplastic scrap is reclaimed by advancing it horizontally through a heated upright grid at a very low and variable input pressure. The grid is characterized by convergent heating surfaces of extensive area arranged to progressively compact the scrap fed thereto, fluidize the scrap, and direct the fluidized material by gravity to a distributor nozzle which initially sheets the fluid material and delivers it to a gauging and solidifying device from which device the sheeted material is pulled by means of gripper rolls driven by an ordinary electric motor of low power rating.

---

This invention relates to a method and apparatus for extruding thermoplastic material which may be, if desired, in the form of scrap or purgings of any size or shape. The apparatus can be constructed to process thermoplastic material whether new, or scrap, said material being fed thereto in mixed, large or small pieces, if desired, to produce sheets, strips, bars, or products of any desired shape. While the method and apparatus herein disclosed by way of example produces rather thick sheets, it will be apparent to those skilled in the art, that the invention is applicable to the formation of products otherwise shaped or proportioned, as may be desired.

An object of the invention is to produce from small pieces of thermoplastic material, a homogeneous or solid product by means of an apparatus and a process which are exceedingly simple, inexpensive and serviceable, so that the end product may be fabricated at very modest cost.

Another object of the invention is to eliminate from a process and apparatus for the purpose stated, the need for expensive molds and costly high-pressure equipment, the operation of which usually is attended by power requirements of a costly nature.

Another object of the invention is to produce plastic sheet from thermoplastic scrap, utilizing a low-pressure method which is exceedingly economical and productive of a uniformly high-grade salable product.

A further object is to provide a method and apparatus of the character and for the purpose stated, which is continuously operative with a minimum of labor and attention involved.

Another object is to provide an improved form of extruder for operating upon a plastic material.

Another object is to provide an improved means of feeding and sheeting an extruded plastic material.

The foregoing and other objects are attained by the means described herein and illustrated upon the accompanying drawings, in which:

FIG. 1 is a perspective view, partly in cross-section, illustrating the apparatus of the present invention.

FIG. 2 is a longitudinal vertical cross-section of the same.

FIG. 3 is an enlarged cross-section taken on line 3—3 of FIG. 2.

FIG. 4 is an enlarged fragmental cross-section taken on line 4—4 of FIG. 3.

FIG. 5 is an enlarged plan view taken on line 5—5 of FIG. 1.

FIG. 6 is a cross-section taken on line 6—6 of FIG. 2.

In the drawings, the numeral 10 indicates generally a simple hopper or receiver of thermoplastic pieces, whether scrap or new, 12, to be reduced to semi-fluid condition by heat. The pressure utilized in hopper 10 to advance the pieces therein toward the grid-like heater is a minimum, therefore, the hopper may be made rectangular with a flat bottom 14, upright side walls 16, and a conventional lid or cover 18. The hopper may be open at one end 20, and closed at its opposite end by a wall 22 which functions principally to retain heat within the interior of the hopper.

A grid-like heater 26 of unique design spans the primary chamber 24 formed by the walls of the hopper, and means may be provided to advance the mass 12 toward and through the heater with a minimum of force while the mass of the charge is reduced to semi-liquid form by the heater. Such means may consist of a ram 28 having a head or piston 30 slidingly fitted to the walls of the hopper, and arranged for selective advancement and retraction by power means, for example, a hydraulic or pneumatic cylinder 32.

Cover 18 when closed may rest lightly upon the upper edge of piston 30. It may here be noted that cover 18 performs mainly to confine the heat of heater 26, and need not be depended upon to preclude upward displacement of mass 12 since the mass is subjected to a very low input pressure advancement toward the heater.

End wall 22 defines a secondary chamber 34 into which the plastic material after heating is discharged, the understanding being that the heated plastic is then in a semifluid condition such that it will gravitate down the output side of heater 26, to enter a distributor nozzle 36. The molten plastic is indicated by numeral 12a, and is shown in FIG. 2 flowing to the distributor nozzle.

Distributor nozzle 36 may comprise a lower wall or plate 38 for guiding the molten plastic onto the upper reach 42 of an endless conveyor belt 40, which travels slowly in a direction to carry the molten plastic continuously away from the nozzle, or to the right in FIGS. 1 and 2. An upper wall or plate 44 of the distributor nozzle is spaced from lower plate 38, and may be adjusted relative thereto, for initially sheeting the molten plastic prior to delivery onto conveyor belt 40. The distributor nozzle is not necessarily provided with end walls to establish the width of the sheet delivered onto the conveyor. A support plate 46 may be provided beneath the upper reach 42 of the conveyor belt, to cooperate with nozzle plate 44 in establishing a tentative thickness of plastic sheet delivered by the nozzle.

The molten plastic initially sheeted by nozzle 36 and deposited upon belt reach 42, then enters a gauging device which establishes the final thickness of the sheet and cools it to solid form. The gauging device and solidifier may be constituted of a pair of flat platens 48 and 50 disposed in spaced parallelism with one another. The lower platen 48 supports the upper reach 42 of conveyor belt 40, and the sheeted plastic carried thereon. The upper platen 50 overlies and applies pressure upon the lower reach 52, of an endless conveyor belt 54, so that said lower reach 52 will in turn apply pressure to the upper face of the plastic sheet carried upon belt 42.

Platens 48 and 50 may be cooled uniformly in any appropriate manner, as by circulating against them a quantity of cold water or other cooling fluid indicated at 56. The platens, moreover, may be either fixedly or adjustably spaced from one another to establish a desired thickness of finished sheet. As the plastic undergoes pressing and gauging between the chilled belt reaches 42 and 52, it solidifies and emerges therefrom as a solid continuous sheet 12b of uniform thickness.

Upon leaving the gauging and solidifying apparatus, the sheet 12b may pass between a pair of gripper rolls 58 and 60, one or both of which may be slowly and continuously rotated by means of a motor M, to pull the sheet from the gauging and solidifying apparatus at a speed compatible with the speed of delivery of molten plastic through nozzle 36. Motor M or its gearing for driving the gripper rolls, accordingly may be variable as to driving speed.

Sheet 12b upon leaving the gripper rolls, passes on to pairs of trimming knives 62–64 which trim off the rough edges of the sheet and establish the desired width thereof. The trimming knives may be in the form of sharpened discs as shown, mounted upon parallel shafts 66, 68, and rotated in any suitable manner, as by means of a chain and sprocket drive 70 powered by motor M, or otherwise. The trimming device as shown is conventional, and may be of any known construction suitable for the purpose.

It may here be pointed out that by constructing the endless belts 40 and 54 of neoprene or equivalent material, the semi-solid plastic material embraced between the belts will be in effect laminated thereto while undergoing gauging and solidification, and as the solidified sheet is stripped from the belts, the sheet will be found to adopt the finish of the belt surfaces. Thus, the finished sheet may be produced with one or more faces carrying a design, or simply a plain finish, depending upon the character of the belts 40 and 54 applied to the gauging and solidifying apparatus. In the preferred form of apparatus, the gripper rolls 58 and 60 pull the formed sheet from the gauging and solidifying section continuously, without necessarily providing drive means for belts 40 or 54.

Attention is now directed to the construction of heater 26, which converts the dry plastic scrap to a semi-fluid state, so that it may gravitate down the output side of the heater and emerge from distributor nozzle 36. The heater may take the form of a rectangular frame supporting a plurality of horizontal hollow knives or wedges 72, which are spaced apart and adapted to be uniformly heated. Each knife or wedge 72 (FIG. 4), may be constructed of sheet metal, or cast metal if preferred, so as to present a pair of divergent side walls 74 and 76 having extensive radiating surfaces. The side walls converge to form a long straight knife edge 76, which is presented to the mass of plastic scrap advanced by ram 30.

At the divergent edges of walls 74 and 76, the walls are connected by a tail plate 78, which is smooth and preferably slightly convex to induce gravitation of molten plastic thereover. At the tail plates, the several heater knives are spaced one from another to permit final flow of plastic therebetween to the region of chamber 34, with an increasing pressure of the advancing plastic against adjacent side walls of successive knives.

Each heater knife is closed at its opposite ends by substantially triangular end walls 80, said end walls being perforated as at 82. The perforations 82 serve as ports which place the interior of each knife in fluid communication with oppositely disposed vertical manifolds or headers 84 and 86. Hot oil or other suitable heating medium may be introduced through a supply pipe 88 to header 84, and exhausted through pipe 90. The heating fluid so introduced is distributed by header 84 to the interior of all the knives, with the exhaust leaving the knives by way of header 86 and pipe 90. Thus, by reheating and recirculating the heating fluid, all of the knives may be uniformly and thoroughly heated constantly, to fluidize the plastic scrap fed thereto by the constantly advancing ram.

By referring to FIG. 4, it is apparent that the hot knife edges shear the plastic scrap and direct it in equal portions to the spaces between adjacent knives; and since the said spaces are defined by progressively convergent heated walls, the plastic masses advancing therethrough are progressively compacted and rendered increasingly dense, with the result that fluidity is soon achieved. The heat transfer area of the knives being very extensive, assures that fluidity of the plastic will occur by the time the plastic reaches the tail plates 78. The fluid plastic then will run down by gravity across the several tail plates and enter the distributor nozzle 36.

In practice, the fluid plastic flows to the distributor nozzle without reaching the rear wall 22 of the hopper. Proper operation requires that the gripper rolls 58, 60, be driven at a speed coordinated with the rate of fluidizing occurring at the heater, or that the heater output be gauged to the speed of sheet withdrawal at the gripper rolls. When the apparatus is operated in this manner, fluid plastic will never fill chamber 34, and the flow to nozzle 36 will be constant. Flow through the nozzle, though constant, is at a reduced rate such that sufficient time is afforded for recharging of the hopper without interruption of the flow onto belt 42. Thus, the output of finished plastic sheet at the gripper rolls is continuous.

Due to the extensive heating area of the several heating knives or blades, the pressure required for moving plastic charge therethrough can be very moderate. Consequently, the ram pressure may be quite low also. Under such conditions, the hopper and the heating knives or blades may be constructed without the use of expensive structurally strong materials, and without resort to costly and complicated reinforcing such as become necessary in conventional plastic molding or extrusion practices. The present process requires no expensive molds or injector equipment, and the apparatus employed is therefore greatly simplified and reduced in cost. Substantial savings are realized also in power costs, and in the expense of maintenance services and parts replacements.

In a typical installation, the equipment may produce finished plastic sheets which are of infinite length, four feet wide, and three-eighths inch thick. The hopper may be about eight feet long, four feet wide, and four feet high. The heater knives or blades may present about 17,000 square inches of surface contact to the in-going plastic scrap, and the distance between the knives or blades at the tail plates 78 may approximate five-sixteenths inch, more or less, depending upon the rate of feed from the hopper, the temperature of the heater, and the nature of the plastic scrap. The widths of nozzle 36 may approximate four feet, to lay down a sheet initially of somewhat greater width. As was previously mentioned, the sheet gauging and solidifying conveyor belts of the apparatus need not be power driven, it being considered preferable to withdraw the solidified sheets therefrom by means of gripper rolls such as 58–60.

The plastic charge, of course, might be fed to the heater by means other than the ram illustrated; for example, a conventional screw feed, a gravity feed, or a continuously moving belt conveyor might be employed for the purpose. The platens 48 and 50 may be cooled using any appropriate known means, in substitution of the circulating water herein suggested by way of example. Various other modifications and changes in structural details of the apparatus may be made, within the scope of the appended claims, without departing from the spirit of the invention.

What is claimed is:

1. Apparatus for reclaiming dry thermoplastic scrap, comprising in combination: a grid including a plurality of wedge-shaped substantially horizontal blades each having an upper and a lower planar wall each extending the full depth of the grid and converging along a forward edge, and spaced apart by a tail plate along a rear edge; means supporting said blades horizontally with the forward edges thereof in spaced substantial parallelism, the rear edge of an upper wall of one blade being in spaced parallelism with the rear edge of a lower wall of an adjacent blade to provide a passageway; means for feeding thermoplastic scrap toward the input side of the grid between the walls of adjacent blades thereof at a controlled rate, means for heating the upper and lower walls and tail plate of the blades to melt the scrap fed therebetween, and means for receiving the melted scrap emerging from said passageways on the output side of the grid, the output side of the heated grid being disposed in an upright plane along which the material fluidized by the grid may gravitate to a lower level in substantially sheet form, an elongated distributor nozzle beneath the lowermost tail plate, receiving said sheet of gravitating fluid material, a movable conveyor beneath the nozzle, said nozzle depositing the fluidized material upon the conveyor as a wide sheet of tentative thickness concurrently with advancement of the conveyor and means for gauging sheet thickness before cooling the sheet to solid form.

2. Apparatus for reclaiming dry thermoplastic particles, comprising in combination; a grid-type heater having on input side and an output side; a plurality of substantially horizontal hollow heater blades each comprising an upper and a lower substantially planar wall meeting to provide a horizontally extending elongate knife edge at the input side of the heater, said walls being divergent in the direction of the output side; a slightly curved tail plate spanning the walls at the output side; the tail plates of adjacent blades being spaced from one another to form elongate horizontal passageways for emergence of fluidized particles melted in passing between adjacent blade walls; means for heating said blade walls; means for feeding thermoplastic particles toward the knife edges of the blades and along the upper and lower walls thereof to the tail plates at a controlled rate, the input side of the heated grid being disposed in an upright plane along which the material fluidized by the grid may gravitate to a lower level in substantially sheet form, an elongated distributor nozzle beneath the lowermost tail plate receiving said sheet of grativating fluid material, a movable conveyor beneath the nozzle, said nozzle depositing the fluidized material upon the conveyor as a wide sheet of tentative thickness concurrently with advancement of the conveyor and means for gauging sheet thickness before cooling the sheet to solid form.

3. Apparatus as set forth in claim 1, wherein the combination includes means for gripping the solidified sheet and withdrawing same by pulling from the sheet gauging and cooling means.

4. Apparatus as set forth in claim 1, wherein the combination includes means to move the conveyor and strip the sheet therefrom at a rate corresponding substantially to the rate of fluid discharged upon the conveyor.

5. Apparatus as set forth in claim 1, wherein the distributor nozzle has opposite open ends to avoid restricting the width of the fluid sheet laid down initially upon the movable conveyor.

6. Apparatus as set forth in claim 1, wherein the combination includes. means for establishing a predetermined uniform thickness of the fluid sheet initially laid down upon the conveyor by the nozzle; and means for cooling the uniformly gauged sheet to solidified form.

7. Apparatus as set forth in claim 1, where the combination includes means for trimming opposite edges of the sheet solidification thereof, and wherein the conveyor is of a material of the class of neoprene.

References Cited

UNITED STATES PATENTS

| | | | |
|---|---|---|---|
| 496,469 | 5/1893 | Wolff | 18—4 |
| 1,920,023 | 7/1933 | Smith | 18—12 |
| 2,167,440 | 7/1939 | Mason. | |
| 2,227,845 | 1/1941 | Rogers. | |
| 2,315,477 | 3/1943 | Parkhurst | 18—12 |
| 2,601,712 | 7/1952 | Keys | 18—9 XR |
| 2,620,513 | 12/1952 | Cryor et al. | 18—9 XR |
| 2,845,058 | 7/1958 | Wadsworth | 126—343.5 |
| 2,916,262 | 12/1959 | Flores | 126—343.5 |
| 2,977,955 | 4/1961 | Altenburg | 126—343.5 |
| 2,989,775 | 6/1961 | Pe Karek | 18—12 |
| 3,039,137 | 6/1962 | Smith et al. | 18—4 |
| 2,756,459 | 7/1956 | Kellner | 18—15 |
| 2,773,496 | 12/1956 | Czarnecki | 18—8 |
| 2,774,988 | 12/1956 | Stirn et al. | 18—15 |
| 3,010,147 | 11/1961 | Davies et al. | |
| 3,044,111 | 7/1962 | Caughey | 18—4 |
| 3,099,042 | 7/1963 | Rabl | 18—15 |
| 3,110,941 | 11/1963 | Fagg | 18—4 XR |
| 3,119,151 | 1/1964 | Corbett | 18—15 |
| 3,180,630 | 4/1965 | Endres et al. | 18—8 XR |
| 3,241,182 | 3/1966 | Kessler | 18—15 |

FOREIGN PATENTS

| | | |
|---|---|---|
| 732,130 | 6/1955 | Great Britain. |

WILLIAM J. STEPHENSON, *Primary Examiner.*